United States Patent [19]
Barnes

[11] Patent Number: 5,873,285
[45] Date of Patent: Feb. 23, 1999

[54] MODULAR REACTION WHEEL

[75] Inventor: Bruce A. Barnes, Phoenix, Ariz.

[73] Assignee: Honeywell Inc., Minneapolis, Minn.

[21] Appl. No.: 855,050

[22] Filed: May 13, 1997

[51] Int. Cl.$^6$ ............................... H02K 7/02; H02K 7/09
[52] U.S. Cl. ............................................ 74/572; 74/574
[58] Field of Search ........................ 74/572–574; 310/91, 310/67 R; 29/596

[56] References Cited

U.S. PATENT DOCUMENTS

| | | | |
|---|---|---|---|
| 4,281,967 | 8/1981 | Mouille et al. ........................ 74/574 X |
| 4,295,069 | 10/1981 | Givan et al. ........................... 310/67 R |
| 4,327,479 | 5/1982 | Futterer et al. ............................ 29/596 |
| 4,337,406 | 6/1982 | Binder ....................................... 310/91 |
| 4,819,502 | 4/1989 | Nakajima et al. ......................... 74/572 |
| 5,398,571 | 3/1995 | Lewis ........................................ 74/572 |

Primary Examiner—Vinh T. Luong
Attorney, Agent, or Firm—Robert E. Greenstien

[57] ABSTRACT

A reaction wheel assembly (RWA) is constructed by placing the electronics on a base and installing on the base a cover that contains the reaction wheel rotor and motor. As the cover in placed over the base, a connector on the cover mates with a connector on the base. The base contains a retractable input plug which is retracted on the base as the cover is installed and then extended from the retracted position through an aperture in the cover and fastened in place. The cover contains filtered vent holes in a wall that separates the base and cover, and evacuation ports are provided on the base and cover to create a vacuum in the RWA to test the electronics.

3 Claims, 6 Drawing Sheets

MODULAR REACTION WHEEL

TECHNICAL FIELD OF THE INVENTION

This invention relates to techniques for constructing and assembling a reaction wheel assembly (RWA).

BACKGROUND OF THE INVENTION

Reaction wheels provide rotating momentum to position and orient orbiting spacecraft. These stabilizing devices contain a very large and heavy wheel and an electric motor to rotate the wheel at a selected speed through motor control electronics to achieve a desired momentum C force opposing spacecraft motion in one plane. A typical spacecraft can have three reaction wheels to stabilize the craft around three axes and provide for craft maneuvers by changing the speed of the wheels.

The motor and wheel are supported on bearings in a reaction wheel housing which must have sufficient strength and rigidity to support the considerable weight of the motor and wheel and the forces that are exerted by the wheel on the craft when the craft moves. The control and drive electronics are sometimes contained within the housing with associated power and control wiring routed and bundled inside the housing, making removal of the electronics difficult. The electronics need to be tested in an environment simulating space conditions, that is, in a vacuum, and this has meant that the electronics are tested in a vacuum chamber prior to insertion into the housing. To avoid damaging the electronics following such testing, the electronics are more often installed outside the wheel housing—rather than risk damaging the tested electronics from the manipulations required to install them inside a small compartment in the housing.

DISCLOSURE OF THE INVENTION

An object of the present invention is provide a modular reaction wheel construction that is less complex to assemble and easier to service and test.

According to the invention, a reaction wheel housing or container has an upper (cover) and lower (base) section. The upper section contains the reaction wheel and its drive or motor. The lower section contains the electronics. A multipin connector is attached to the bottom wall of the top section and mates with a connector on the electronics when the two sections are joined and fastened. Airflow passages are provided between the two sections and each has an evacuation port.

According to the invention, once the container is assembled it is evacuated to test the electronics.

According to the invention, input connectors for the electronics are retractably mounted on the lower section. The connectors are retracted as the top section is lower on to the bottom section. After the two sections are joined the connectors are extended through holes in the lower section and fastened in position.

According to the invention, a vacuum is applied to either the cover or the base to test the electronics.

A feature of the invention is that it provides modular reaction wheel; that is, the wheel and its electronics are securely housed in the same container. It also provides less expensive way to construct a reaction wheel because the electronics can be tested in a vacuum in their permanent location rather than a test fixture.

Other objects, benefits and features of the invention will be apparent from the following discussion of one or more embodiments.

BRIEF DESCRIPTION OF THE DRAWING

FIG. 6b is a section along line 6b—6b in FIG. 6a.

BEST MODE FOR CARRYING OUT THE INVENTION

Figure 1:
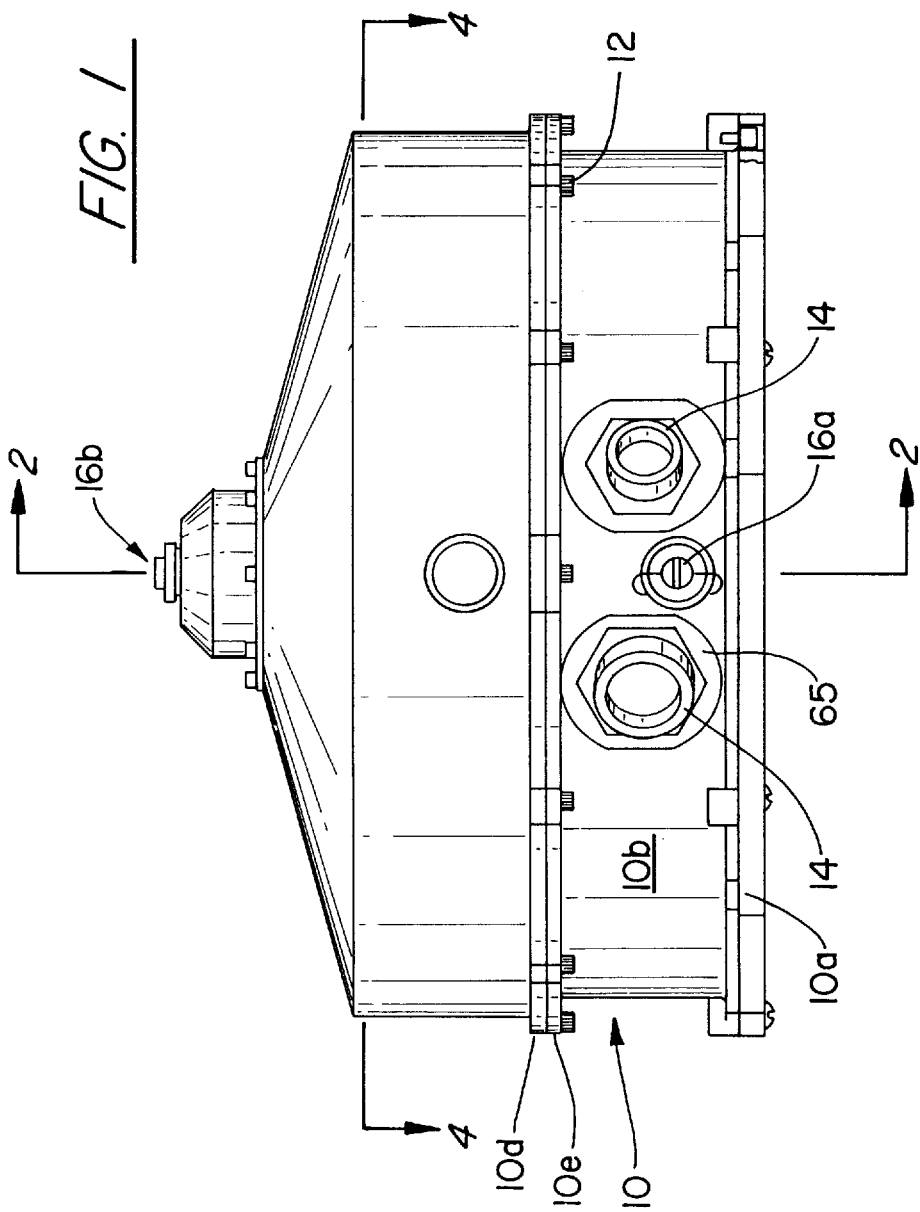
FIG. 1 is an elevation of a reaction wheel assembly (RWA) embodying the present invention.

FIG. 1 shows a modular reaction wheel assembly, which contains a base 10a and a cover 10 comprising a lower section 10b fastened to the base 10a and an upper section 10c that is attached using peripheral flange fasteners 12 the join flanges 10d and 10e together. Electrical connectors 14 are installed on the lower section 10b, which also contains a valve (evacuation port) 16a to evacuate the RWA. Another valve (evacuation port) 16b is placed in the top section 10c for the same purpose.

Figure 2:
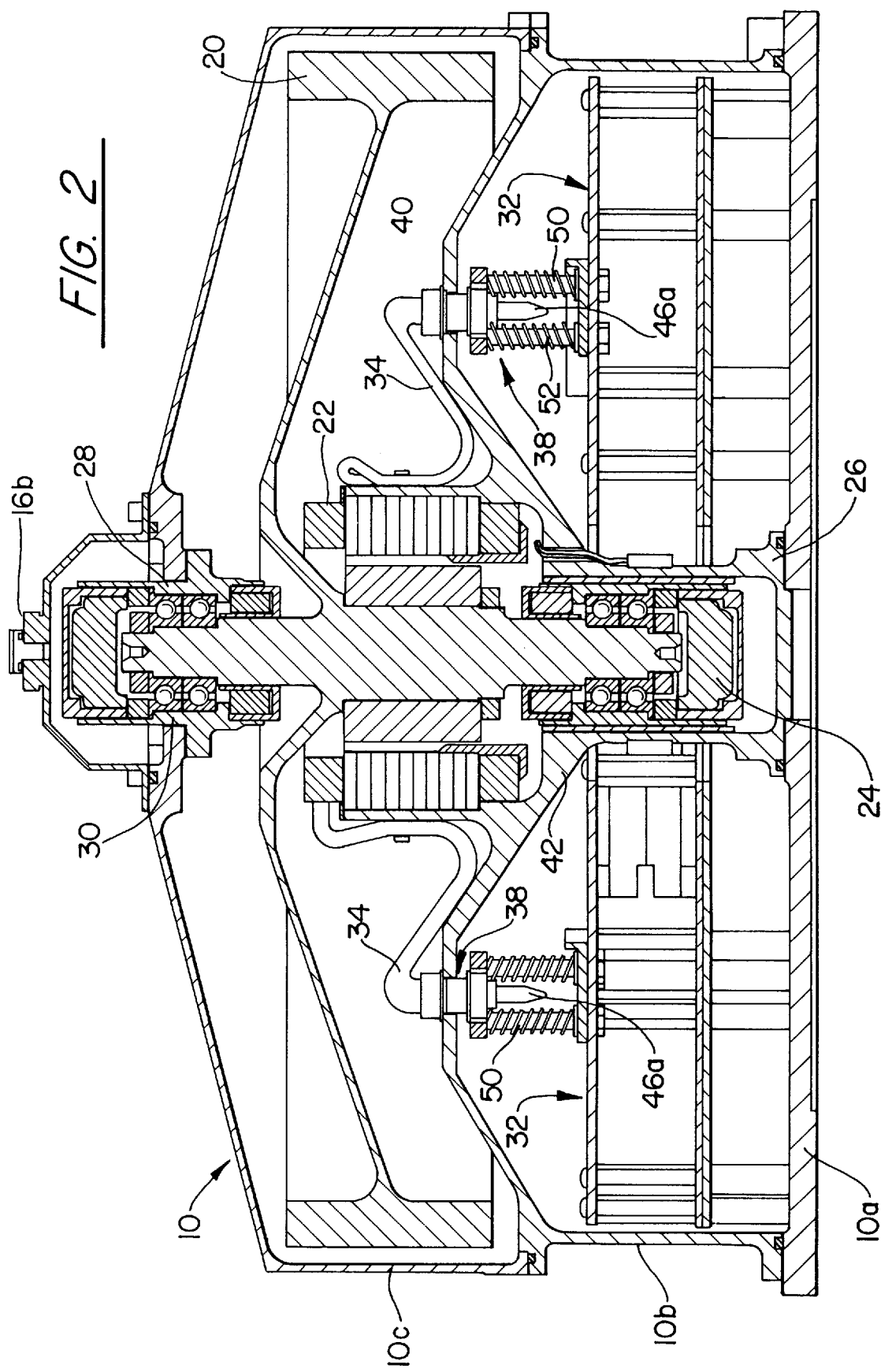
FIG. 2 is a section rotated 90 degrees along 2—2 in FIG. 1.
Figure 3:
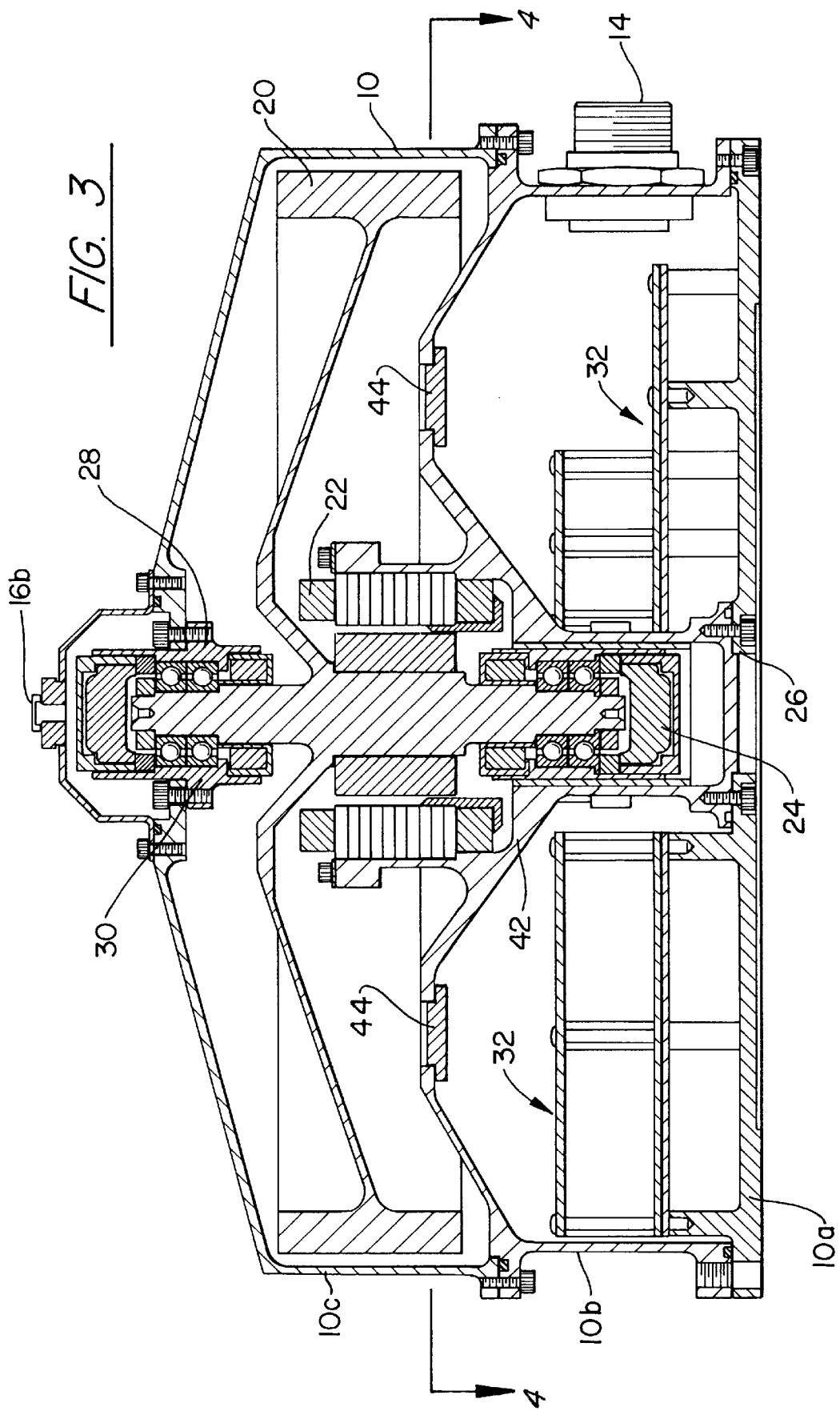
FIG. 3 is a section along 2—2 in FIG. 1.

FIGS. 2 and 3 show the reaction wheel rotor 20 and electric motor 22 which are located within the upper section 10c. A bearing assembly 24 is supported in a bearing seat 26 that is part of the upper section 10c and which rests on the base 10a. An upper bearing assembly 28 is supported in a seat 30 in the top or dome of the uppers section 10c. Control electronic circuit boards 32 (electronics) are screw fastened with appropriate standoffs to the base. Electrical cables 34 extend from the motor 22 to a multipin connector 38 to provide power and motor control through the circuit boards 32. When the top section 10c is removed from the bottom section 10b, the electrical connection is synchronously broken at the male and female sections of the connector 32, which will be explained below in more detail.

Figure 4:
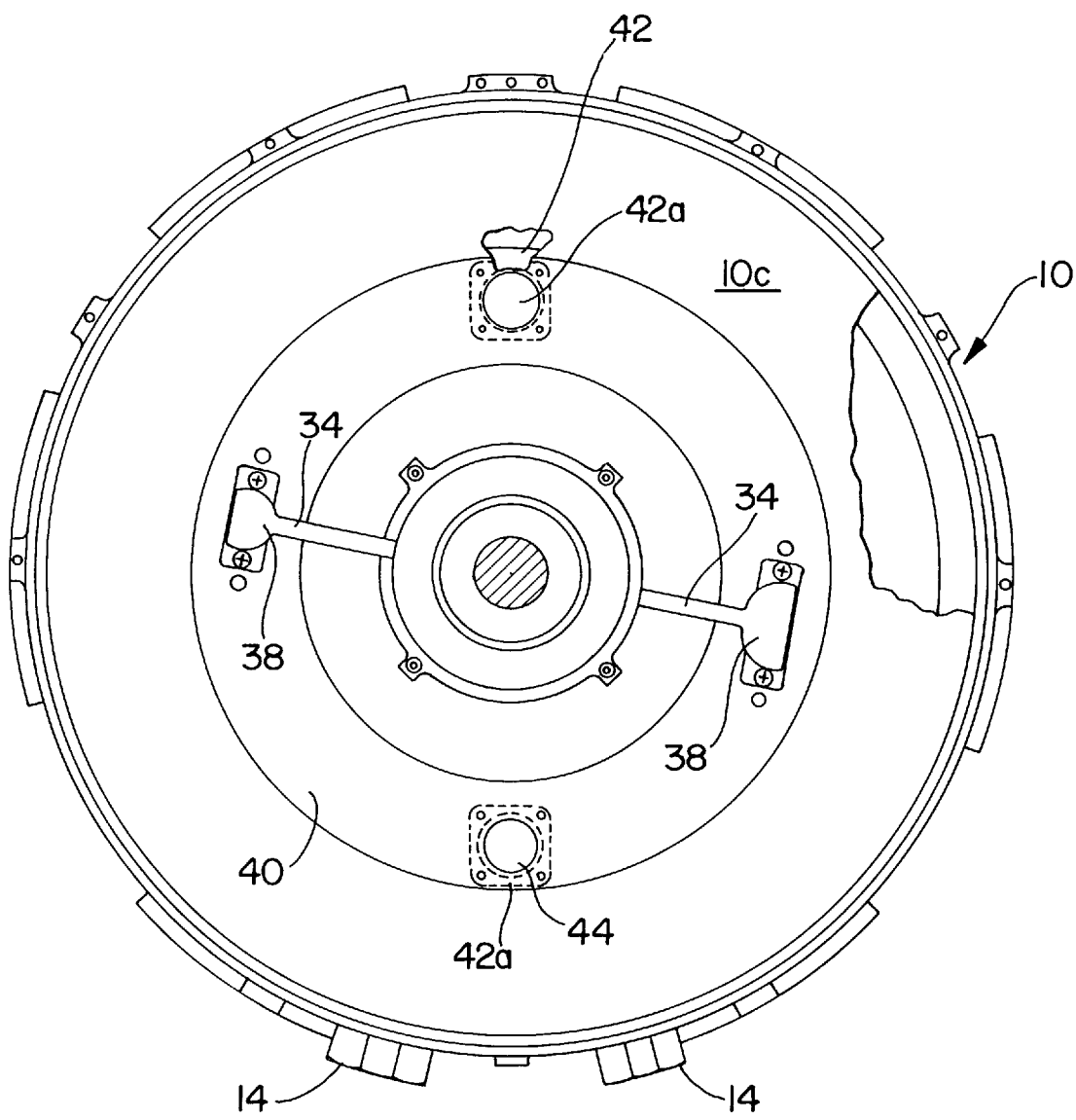
FIG. 4 is a section along 4—4 in FIG. 1.

From FIG. 4, it can be seen that the connector assemblies 38 are located in a circular wall 40 with the appearance of a dome in FIGS. 2 and 3. The inner walls 42 extending from the dome are integral with the bearing seat 26, forming an extremely rigid structure for the bearing 24 and the considerable loading created by both the weight of the reaction wheel rotor 20 and the torque created when the RWA is moved as the wheel rotor rotates. Also in the dome area 40, filtered vents 42 are provided so that evacuation through either of the two evacuation ports will evacuate the entire interior of the RWA. Filter material 42a in the vents 42 prevents contaminants from passing between the electronics section (base) and the mechanical section (cover) during the evacuation process and subsequent pressurization after testing.

Figure 5A:
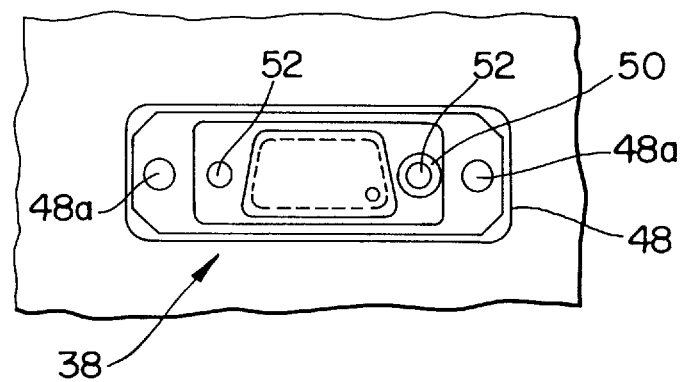
FIG. 5a is a plan view of a connector receptacle mounted on the electronics.
Figure 5B:
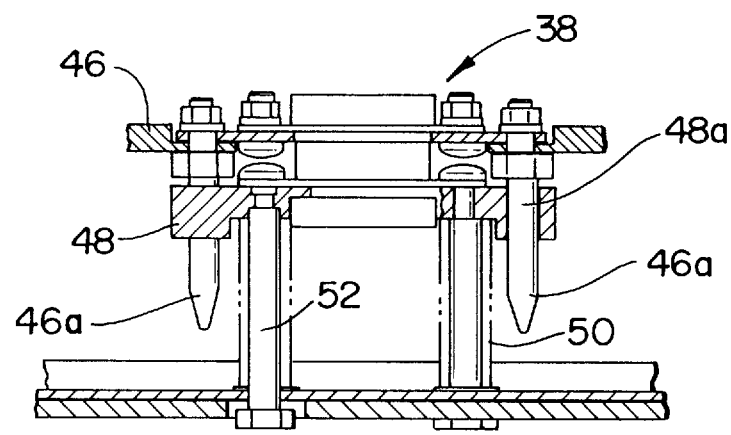
FIG. 5b is an elevation of the connector that is inserted in the recepactle.

Referring to FIG. 5a and FIG. 5b, that the connector 38 has a male section 46 and female section 48. The section 46 is fastened on surface 40 and contains guide pins 46a which extend into guide slots 48a on the female section 48 as the base 10a and section 10b are attached. Expansion springs 50 surround guide posts 52, resiliently mating the female section 48 and the male section 46.

Figure 6A:
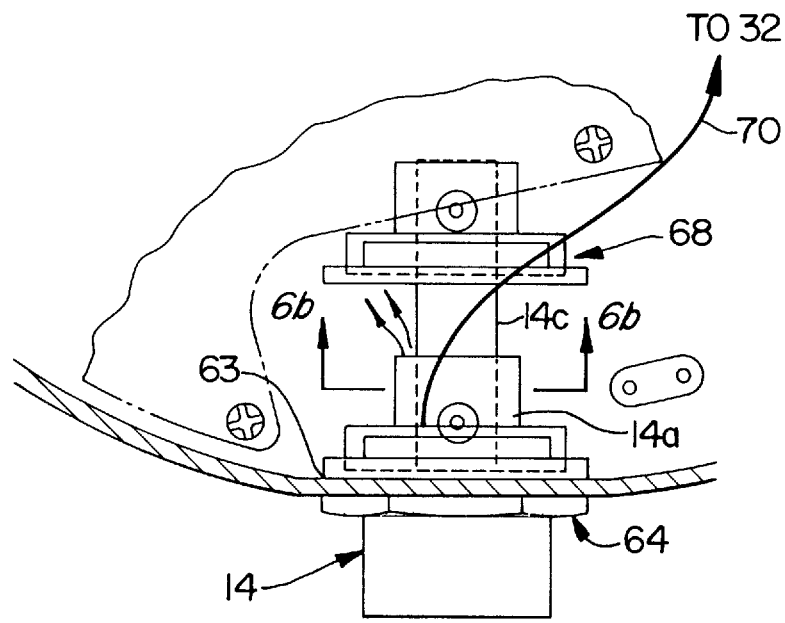
FIG. 6a is plan view of a retractable connector that extends through the wall of the RWA according to the present invention.
Figure 6B:
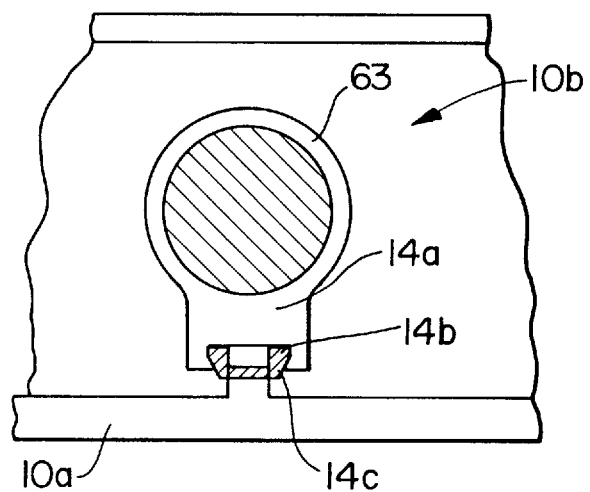

The input connectors 14 are retractable to permit the installation of the cover 10b on the base 10c. FIG. 6a shows that these connectors 14 are attached to a holder or carrier 14*a* that has a female dovetail track 14*b* that slides on a male dovetail track 14*c*, which is attached to the base 10*c*. A nut 64 is threaded on to the connector 14 after it is extended (pulled) from the retracted position 68 through an aperture 63 in the base 10*b*—after the section 10*c* is in place on the base 10*a*—fastening the connector 14 securely in place. A gasket 65 seals the space between the connector 14 and the cover. Conductors 70 extend from the connectors 14 to the electronics 32.

Although the present invention has been described with reference to preferred embodiments one of ordinary skill in the art will be able to make modifications and changes, in addition to any already described, in whole or in part to the components and devices described above to carry out the invention without departing from the spirit and scope of the invention.

I claim:

1. A reaction wheel assembly characterized by:

a base (10*b*);

electronics (32) attached to the base (10*b*);

a cover (10) that is inserted on and attached to the base, said cover containing a bearing supports (26, 28) for a reaction (20) and motor bearing (24);

a first electrical connector (46) that is attached to the cover (10);

a second electrical connector (48) attached to the electronics;

a guide pin (46*a*) to align the first and second electric connectors; and spring means (50) for holding the first and second electrical connectors together.

2. The reaction wheel assembly described in claim 1, further characterized by:

vent means (42) for allowing airflow through the cover and an evacuation port (16*a*, 16*b*) to evacuate the reaction wheel assembly.

3. The reaction wheel described in claim 1, further characterized by:

an input connector (14) that is retractably mounted on the base (10*b*) in an aperture in the cover (10).

\* \* \* \* \*